United States Patent [19]

Prince et al.

[11] 3,996,139
[45] Dec. 7, 1976

[54] LIQUID WASTE TREATMENT APPARATUS

[76] Inventors: Jack E. Prince; Franklin E. Terry, both of 2927 31st St., Port Arthur, Tex. 77640; William H. Mullins, 230 W. King Highway, San Antonio, Tex. 78212

[22] Filed: May 23, 1975

[21] Appl. No.: 580,521

Related U.S. Application Data

[63] Continuation-in-part of Ser. No. 329,441, Feb. 5, 1973, abandoned.

[52] U.S. Cl. .................. 210/198 R; 210/416 R; 261/DIG. 75
[51] Int. Cl.$^2$ .................. B01F 3/04; C02C 1/08
[58] Field of Search ......... 137/584; 210/44, 198 R, 210/220, 416; 261/76, 87, 93, DIG. 75, 77; 259/4, 7

[56] References Cited

UNITED STATES PATENTS

| | | | |
|---|---|---|---|
| 487,887 | 12/1892 | Howell | 261/DIG. 75 |
| 1,594,641 | 8/1926 | Starr | 261/76 X |
| 1,821,914 | 9/1931 | Wagener | 261/DIG. 75 |
| 1,867,512 | 7/1932 | Kusch | 210/220 X |
| 2,440,514 | 4/1948 | Karlstrom | 210/44 |
| 2,521,215 | 9/1950 | Haddeland et al. | 261/DIG. 75 |
| 2,797,132 | 6/1957 | Alpert | 137/584 |
| 3,243,046 | 3/1966 | Kakumoto et al. | 261/76 X |
| 3,524,630 | 8/1970 | Marion | 261/76 |
| 3,655,343 | 4/1972 | Galeano | 261/DIG. 75 |

FOREIGN PATENTS OR APPLICATIONS

| | | | |
|---|---|---|---|
| 1,377,571 | 9/1964 | France | 261/DIG. 75 |
| 1,517,502 | 11/1970 | Germany | 261/DIG. 75 |

*Primary Examiner*—Charles N. Hart
*Assistant Examiner*—Robert H. Spitzer
*Attorney, Agent, or Firm*—Cox, Smith, Smith, Hale & Guenther Incorporated

[57] ABSTRACT

A self-contained waste-liquid extraction, aeration and return system including an aspirator having an elongate mixing chamber downstream of the aspiration point and a liquid pump carrying the aspirator in a unit which is independent of the structure or of the liquid circuit of the system to which it is applied.

A particularly effective and structurally rugged aspirator is included.

8 Claims, 3 Drawing Figures

LIQUID WASTE TREATMENT APPARATUS

BACKGROUND OF THE INVENTION

This is a continuation-in-part of U.S. patent application Ser. No. 329,441 filed on Feb. 5, 1973; now abandoned which has the same inventors as the present application.

The current problem of water pollution is sufficiently well known that a discussion herein would be superflous.

However, we are currently faced with statutes requiring both the immediate improvement in existing waste water systems and the pretreatment of industrial or agricultural effluents before the effluent reaches such overloaded treatment facilities.

In most cases, extreme difficulties are encountered in trying to expand or upgrade sewage treatment plants. Either additional land is not available or additional, major funds are not available — or both are impossible to obtain at all or in the time period required.

Industrial and agricultural enterprises, in many cases, cannot justify the costs of known fixed-treatment units alternatively, they are penalized for delivery of excessive waste concentrations.

BRIEF DESCRIPTION OF THE PRIOR ART

Aeration of waste liquids is recognized as one of the key methods for treatment of effluents.

However, prior systems have required fixed installations, such as large tanks with bubbling spargers located in the lower regions. Also, certain attempts have been made in withdrawing, aerating and returning or advancing waste liquid, again from fixed vessels into which the equipment is originally incorporated.

The prior systems have not been found entirely satisfactory under present circumstances.

SUMMARY OF THE INVENTION

The present invention provides a self-contained extraction, aeration and return unit capable of intrusion into existing liquid circuits. The unit of the invention can intrude either as a supplementing step, such as for boosting aeration-rates in existing aerating vessels, or as a preliminary step either immediately before the remaining treatment steps or at a geographically remote point which permits action of the oxygen in the waste liquid while enroute to a treatment plant. The invention is not limited to use in the treatment of sewage but has application in any liquid circuit where aeration is required such as reducing mineral content of potable water and aquaculture applications.

In addition to its use as an oxygenating aerator, the unit or the preferred form of the aspirating aerator may be employed to infuse relatively cooler air into warm or hot waste liquid and thereby reduce the temperature of waste liquid.

The preferred form of the invention includes an aspirator having an elongate, constant-area mixing chamber at and immediately downstream from the point at which the air is drawn into the liquid.

BRIEF DESCRIPTION OF THE DRAWINGS

A better understanding of the invention may be derived from the following description and accompanying drawings, in which.

DESCRIPTION OF THE PREFERRED EMBODIMENT

Figure 1:
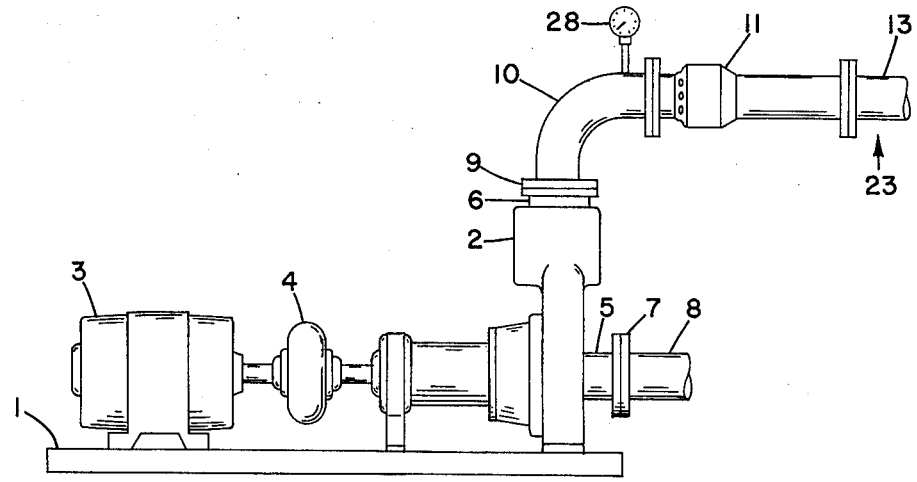
FIG. 1 is a side elevation of the preferred form of the invention.
Figure 2:
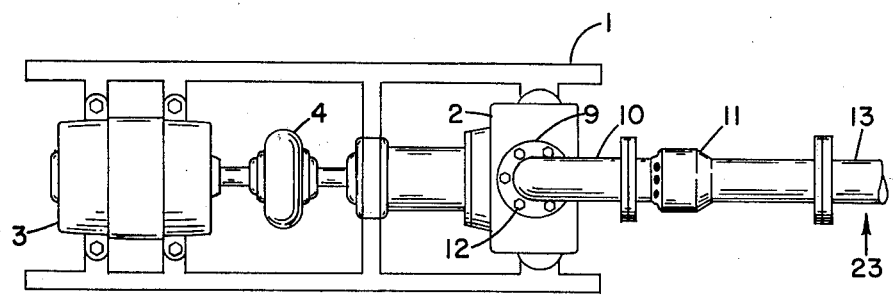
FIG. 2 is a plane view of the unit of FIG. 1.

As shown in FIGS. 1 and 2, the preferred unit of the present invention includes a base frame 1 carrying a pump 2 and a motor 3. The pump is driven by the motor 3 via a flexible shock coupling 4 engaging the respective shafts. However, it is to be understood that in many instances, a V-belt drive is preferred.

The pump 2 has an inlet 5 opening laterally and an outlet 6 opening upwardly. The inlet 5 has a flange 7 or other suitable means for coupling to a pipe 8. The outlet 6 similarly carries a shoulder or flange 9 or other suitable means for structurally supporting an elbow 10 and an aerator 11.

The flange 9, which carries a ring 12 of bolt holes, permits rotation or installation of the elbow 10 and aerator 11 in rotational position about the generally upright axis of the outlet. The discharge of the aerator 11 thus can be coupled to a discharge pipe 13 which may be arranged to discharge back to the source from which the liquid was drawn via pipe 8, or may discharge to any other desired point.

Figure 3:
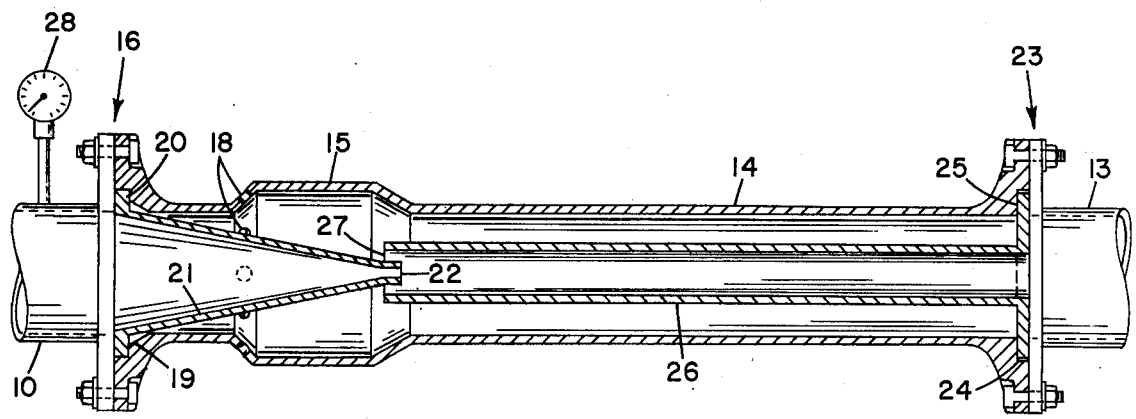
FIG. 3 is an enlarged, sectional view of the preferred aspirator of the invention.

As shown in FIG. 3, the preferred form of aerator 11 includes a casing 14 having an enlarged portion 15 adjacent the inlet end 16 of the aerator. The enlarged portion 15 has a ring of apertures 18 opening to the atmosphere or another suitable source of oxygen.

The inlet end 16 has an annular recess 19 to receive a closely fitting rim 20 of a tapered member or cone 21 which tapers inwardly and terminates in a relatively small nozzle 22 adjacent the downstream end of the enlarged portion 15.

The outlet end 23 of the aerator 11 has an annular recess 24 to receive a closely-fitting rim 25 of an elongated, tubular mixing chamber 26. The mixing chamber 26 extends coaxially of the casing 14. The mixing chamber terminates in an aspirating aperture 27 surrounding the discharge nozzle 22 of the cone 21.

Aspirating aerators or venturis typically increase their diameters immediately after the air-entrance point.

We have found that the mixing chamber is particularly effective, in terms of aspirating efficiency and thorough, intimate mixing of air within the liquid, when the length of the uniform inner-diameter chamber is at least 4 times the inner diameter. A ratio of 5 to 6 has been found to be the most effective, while length diameter ratios over 7 become too lengthy, without a justifying improvement in performance.

Also, we prefer a sudden change of flow-area from the mixing chamber 26 into the discharge pipe, instead of a tapering cone or "evase". The turbulence and "shear" occurring upon expansion, at the outlet end of the mixing chamber, is effective in assisting the intimate mixing of the air and liquid.

The shearing action upon release of the combined air and liquid from the mixing chamber 26 into the discharge pipe 13 is very important to the present invention. Since the liquid contains solid waste particles to be treated, the particles have to be broken down until the liquid becomes a slurry with only very small particles contained therein. By suddenly discharging to a much larger cross sectional area, the gas previously trapped in the solid particles expands to explode or shatter the solid particles when combined with the sudden shearing action. Since the discharge pipe is normally a tank at a pumping station, or a sewerage line, pressure inside the discharge pipe will be near ambient pressure as is the normal situation for almost all sewage treatment systems. The aspirating aerator does not operate as efficiently if a head of liquid is maintained at the discharge of the mixing chamber 26.

The relationship between the diameter of the aspirating aperture 27 and the exterior of the cone nozzle 22 is significant. We prefer that the cone O.D. at the aperture comprise at least 75% of the ID of the mixing chamber (and therefore, the aperture 27). We prefer a range of 80% to 90%, with the lower percentage being best in, for example, a 2 inch ID mixing chamber, with the higher percentages being advantageous in larger-diameter chambers, such as a 4 inch ID chamber.

An indicator such as the pressure gauge 28 may be provided as a monitor of the operation of the unit.

OPERATION OF THE PREFERRED EMBODIMENT

In use, the unit of the present invention is located adjacent a source of liquid to be treated, such as an existing process tank or a lift station. A pipe 8 is dropped into the liquid source and the discharge pipe 13 is connected either back to the source or to a further point in this liquid circuit.

The pump 2 draws liquid via pipe 8 and forces it through the elbow 10, the cone 21 and the mixing chamber 26 to the discharge pipe 13. The "jump" at the nozzle 22 causes aspiration of air through the aperture 27, as in ordinary venturi aerators. The air thus incorporated is closely mixed in the flowing, confined liquid passing within the mixing chamber 26. On release from the uniform-diameter chamber 26 into the larger pipe 13, further turbulence and eddying is applied to the mixture.

It should be noted that the aspirating aerator of our invention not only is particularly effective in performance, but also is especially simple and rugged. This permits a self-supporting assembly, such as disclosed, as well as facilitating cleaning and repair. The rim-mounts, in particular, avoid the need for weldments, positioning struts, and the like, which are often encountered, while the entire assembly includes only three pieces.

Various changes may be made in the details of the invention, as described, without sacrificing the advantages therefor departing from the scope of the appended claims.

What is claimed is:

1. A liquid waste treatment unit comprising:
a. a base frame,
b. a pump mounted on said base frame,
c. drive means mounted on said base frame driving said pump,
d. said pump having an inlet and an outlet,
e. coupling means associated with said pump inlet for connecting to a waste liquid source,
f. an aerator connected to said pump outlet and extending generally horizontally therefrom,
g. said aerator including a nozzle discharging into an opening of a mixing chamber of substantially uniform cross sectional area, said mixing chamber communicating directly with an ambient pressure zone of substantially greater cross sectional area, said uniform cross sectional area being of substantially reduced cross sectional area from said pump outlet, and
h. coupling means associated with said pump outlet and said aerator for positioning said aerator in selected positions about the pump outlet,
i. said nozzle having an outer diameter in the range of 80% to 90% of an inner diameter of said opening of said mixing chamber.

2. The liquid waste treatment unit of claim 1 in which the ratio of the length of the chamber to the diameter of the chamber is in the range of a ratio of four to a ratio of seven.

3. The waste liquid treatment unit of claim 2 in which the length to diameter ratio of the mixing chamber is in the range of a ratio of five to a ratio of six.

4. An aspirating aerator for liquids comprising:
a. an elongated housing having
b. a longitudinal bore therein extending between
c. an inlet and
d. an outlet in said housing,
e. a tapered inlet member extending into said bore from said inlet and terminating in
f. a liquid discharge nozzle,
g. a mixing chamber of substantially uniform cross sectional area extending from said outlet through said bore and terminating in
h. an aperture adjacent said nozzle
i. said aperture being arranged in a position surrounding the nozzle of the tapered member, and communicating with a source of oxygen with said oxygen being drawn into said aperture by the pressure differential caused by said discharging liquids.
j. said substantially uniform cross sectional area being substantially smaller in cross sectional area than said inlet, said substantially uniform cross sectional area abruptly terminating in said outlet having a substantially larger cross sectional area,
k. said liquid discharge nozzle having an outer diameter in the range of 80% to 90% of an inner diameter of said aperture.

5. The aerator of claim 4 including mounting means for positioning said tapered member and said mixing chamber, the mounting means for said tapered member including a rim on said tapered member, recess means in said housing for receiving said rim in a close fit to position and support said member when the aerator is assembled.

6. The aerator of claim 4 in which said mixing chamber is substantially uniform in cross section throughout its length, the ratio of its length to its diameter is in the range of a ratio of four to a ratio of seven.

7. Waste liquid treatment unit of claim 4 in which the substantially larger cross sectional area comprises a relatively large discharge pipe at approximately ambient pressure.

8. An aspirating aerator according to claim 4 in which the means for supplying oxygen consists of a ring of apertures around said elongated housing.

* * * * *